(12) United States Patent  
Cantwell et al.

(10) Patent No.: US 12,433,243 B2
(45) Date of Patent: *Oct. 7, 2025

(54) ANIMAL CRATE WITH REMOVABLY COUPLED DIVIDER PANEL ASSEMBLY

(71) Applicant: MID-WEST METAL PRODUCTS COMPANY, INC., Muncie, IN (US)

(72) Inventors: Brad Cantwell, Muncie, IN (US); Stew Kerr, Muncie, IN (US); Michael E. Greene, Muncie, IN (US); David J. Nolley, Muncie, IN (US)

(73) Assignee: Mid-West Metal Products Company, Inc., Muncie, IN (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/986,088

(22) Filed: Nov. 14, 2022

(65) Prior Publication Data

US 2023/0074728 A1 Mar. 9, 2023

Related U.S. Application Data

(63) Continuation of application No. 16/687,967, filed on Nov. 19, 2019, now Pat. No. 11,497,190.

(51) Int. Cl.
*A01K 1/035* (2006.01)
*A01K 1/03* (2006.01)
*F16B 7/04* (2006.01)
*F16B 7/22* (2006.01)

(52) U.S. Cl.
CPC .............. *A01K 1/035* (2013.01); *A01K 1/03* (2013.01); *F16B 7/0433* (2013.01); *F16B 7/22* (2013.01)

(58) Field of Classification Search
CPC .. A01K 1/035; A01K 1/03; F16B 7/22; F16B 7/043
USPC .............................. 119/472, 474, 481; 220/7
See application file for complete search history.

(56) References Cited

U.S. PATENT DOCUMENTS

| | | | |
|---|---|---|---|
| 2,113,743 A | 4/1938 | Phipps | |
| 3,195,505 A | 7/1965 | Hauth | |
| 3,896,766 A | 7/1975 | Martin | |
| 3,912,313 A | 10/1975 | Pigorsh | |
| 4,106,626 A | 8/1978 | Trubiano | |
| 4,173,289 A | 11/1979 | Nesti | |
| 4,222,348 A | 9/1980 | Nield | |
| 5,373,810 A * | 12/1994 | Martin | A01K 31/02 119/459 |
| 5,549,073 A * | 8/1996 | Askins | A01K 1/033 119/474 |

(Continued)

*Primary Examiner* — Zoe Tam Tran
(74) *Attorney, Agent, or Firm* — Taft Stettinius & Hollister LLP; Stephen F. Rost

(57) ABSTRACT

A divider panel assembly for being assembled within an interior of an animal enclosure includes a body defined by a plurality of interconnecting horizontal and vertical wires, the body including a height and width defined by a top horizontal wire, a bottom horizontal wire, a first vertical wire and a second vertical wire. A hook end is formed by at least one of the plurality of horizontal or vertical wires of the body, the hook end configured to engage with the animal enclosure. A clip is rotatably coupled to the first vertical wire or the second vertical wire, where the clip includes a first defined opening for receiving the first or second vertical wire and a second opening configured for receiving a wire of the animal enclosure.

20 Claims, 9 Drawing Sheets

(56) References Cited

U.S. PATENT DOCUMENTS

| | | |
|---|---|---|
| 5,626,098 A | 5/1997 | Askins |
| D384,443 S * | 9/1997 | Olfert .......................... D30/119 |
| 5,727,502 A | 3/1998 | Askins |
| 6,606,964 B2 | 8/2003 | Marchioro |
| D652,998 S | 1/2012 | Cantwell et al. |
| D653,405 S | 1/2012 | Cantwell et al. |
| D653,814 S | 2/2012 | Cantwell |
| D668,397 S | 10/2012 | Cantwell et al. |
| D670,448 S | 11/2012 | Cantwell et al. |
| 8,443,760 B2 | 5/2013 | Bailey |
| 8,627,603 B2 | 1/2014 | Flannery |
| 8,985,058 B2 | 3/2015 | Cantwell et al. |
| 9,258,978 B2 | 1/2016 | Link |
| 9,399,886 B2 | 3/2016 | Link |
| 9,706,749 B2 * | 7/2017 | Link ....................... A01K 1/034 |
| 9,936,672 B2 | 4/2018 | Link |
| 10,378,255 B2 | 8/2019 | McDaid |
| D996,744 S * | 8/2023 | Cantwell ....................... D30/161 |
| 2004/0045511 A1* | 3/2004 | Migita ................... A01K 1/031 <br> 119/472 |
| 2006/0000422 A1* | 1/2006 | Cheng .................... A01K 31/06 <br> 119/455 |
| 2009/0314220 A1 | 12/2009 | Groh |
| 2012/0186529 A1* | 7/2012 | Cantwell ................ A01K 1/034 <br> 119/474 |
| 2012/0210947 A1 | 8/2012 | DiPaolo |
| 2012/0227675 A1 | 8/2012 | Link |
| 2012/0227328 A1* | 9/2012 | Link ...................... A01K 1/034 <br> 49/394 |
| 2013/0048588 A1* | 2/2013 | Vilkomirski ....... A47B 87/0223 <br> 220/4.01 |
| 2015/0047572 A1 | 2/2015 | Rybka |
| 2017/0000080 A1* | 1/2017 | Bin .......................... A01K 1/03 |
| 2021/0337765 A1* | 11/2021 | Cantwell ................ A01K 1/033 |
| 2024/0008445 A1* | 1/2024 | Vaccari ................. F16B 5/0614 |

* cited by examiner

ANIMAL CRATE WITH REMOVABLY COUPLED DIVIDER PANEL ASSEMBLY

RELATED APPLICATIONS

This application is a continuation of U.S. patent application Ser. No. 16/687,967, filed Nov. 19, 2019, entitled "ANIMAL CRATE WITH REMOVABLY COUPLED DIVIDER PANEL ASSEMBLY," the disclosure of which is hereby incorporated by reference in its entirety.

FIELD OF THE DISCLOSURE

The present disclosure relates to an animal enclosure, and, in particular, to an animal crate having a removably coupled divider panel assembly.

BACKGROUND

The use of animal cages or crate is well known. Many conventional cages have been developed over the years for housing animals of different shapes and sizes. For instance, animal cages typically house dogs and cats. Rabbits, rodents and other small animals have also been known to be housed by such cages and are quite common. In fact, such cages are also used for farm animals when needed, including ducks and chickens. As cages have been further developed, the portability and ease of use have become points of emphasis. Some conventional cages, for example, have been designed to collapse to a compact structure for portability. Others have been designed to be of light weight and from durable materials. Conventional cages have been designed for ease of transporting an animal. Some conventional cages are designed as exercise pens that provide an interior space that the animal can move about, particularly outdoors.

Most conventional cages include at least one door for providing access to the interior of the cage. The animal enters or exits the cage through an opening when the door is opened, and the animal can be safely contained in the cage when the door is closed. Many conventional cages include a door that is attached to the cage with a hinge. In some conventional cages, the doors swing from a side of the cage and in others the door swings from the bottom or top of the cage. This allows the door to be swung from a closed position to an open and vice versa. In cages with side or top swinging doors, the animal can walk into the cage. In cages with bottom swinging doors, the animal is typically placed into and removed from the cage by the owner. A variety of latches have been incorporated into the design of the door to allow a user to open, close, and or securely latch the door.

Many of these conventional designs have limitations, however. A younger animal requires less space in the interior of the crate than an older, more mature animal. However, a conventional crate is usually designed where the interior has a fixed capacity. Thus, as the animal grows, the capacity of the crate never changes. For a pet owner, it can be expensive to purchase larger crates as their animal gets bigger.

Therefore, a need exists for an improved animal enclosure that allows for the area inside the enclosure to be modified based on the size of the animal.

SUMMARY

In one embodiment of the present disclosure, a divider panel assembly for being assembled within an interior of an animal enclosure includes a body defined by a plurality of interconnecting horizontal and vertical wires, the body including a height and width defined by a top horizontal wire, a bottom horizontal wire, a first vertical wire and a second vertical wire; a hook end formed by at least one of the plurality of horizontal or vertical wires of the body, the hook end configured to engage with the animal enclosure; and a clip rotatably coupled to the first vertical wire or the second vertical wire, the clip including a first defined opening for receiving the first or second vertical wire and a second opening configured for receiving a wire of the animal enclosure.

In one example of this embodiment, the hook end comprises a plurality of hook ends from by two or more of the plurality of vertical wires of the body. In a second example, the plurality of hook ends extend beyond the top horizontal wire. In a third example, the hook end comprises a plurality of hook ends from by two or more of the plurality of horizontal wires of the body. In a fourth example, the plurality of hook ends extend beyond the first or second vertical wire.

In a fifth example, the clip comprises a plurality of clips rotatably coupled about the first vertical wire and the second vertical wire. In a sixth example, the clip comprises a plurality of clips rotatably coupled about only the first vertical wire or the second vertical wire. In a seventh example, the hook end comprises a plurality of hook ends formed by two or more of the plurality of vertical wires of the body, the plurality of hook ends extending beyond the top horizontal wire; and the clip comprises a plurality of clips rotatably coupled about the first and second vertical wire.

In an eighth example, the hook end comprises a plurality of hook ends formed by two or more of the plurality of horizontal wires of the body, the plurality of hook ends extending beyond the first vertical wire; and the clip comprises a plurality of clips rotatably coupled about the second vertical wire. In a ninth example, the clip is removably coupled to the first vertical wire or the second vertical wire in a snap-fit connection.

In another embodiment of the present disclosure, an animal enclosure includes a plurality of members each formed by a plurality of interconnecting horizontal and vertical wires, the plurality of members defining an interior of the enclosure and including at least a first side member and a second side member; a divider panel assembly having a body defined by a plurality of interconnecting horizontal and vertical wires, the body including a height and width defined by a top horizontal wire, a bottom horizontal wire, a first vertical wire and a second vertical wire; a hook end formed by at least one of the plurality of horizontal or vertical wires of the body, the hook end configured to engage with one of the plurality of members of the animal enclosure when the divider panel assembly is positioned within the interior; and a clip coupled to the first vertical wire or the second vertical wire, the clip including a first defined opening for receiving the first or second vertical wire of the divider panel assembly and a second opening for receiving one of the plurality of vertical wires of the first or second member; wherein, when the divider panel assembly is positioned within the interior of the enclosure, the hook end is coupled to one of the plurality of horizontal or vertical wires of one of the plurality of members, and the clip is coupled to one of the plurality of vertical wires of the first or second member; further wherein, when the divider panel assembly is coupled to the animal enclosure within the interior thereof, the divider panel assembly divides the interior into a first portion and a second portion so as to block access between the first and second portions.

In one example of this embodiment, the hook end is coupled to a different wire than the clip. In a second example, a top member of the animal enclosure is provided, wherein the hook end is coupled to the top member and the clip is coupled to the first vertical wire or the second vertical wire. In a third example, the hook end extends laterally beyond the first vertical wire; the clip is rotatably coupled to the second vertical wire; and when the divider panel assembly is coupled to the enclosure, the hook end is coupled to one of the plurality of vertical wires of the first side member and the clip is coupled to one of the plurality of vertical wires of the second side member.

In a fourth example, the hook end comprises a plurality of hook ends from by two or more of the plurality of vertical wires of the body, the plurality of hook ends extending beyond the top horizontal wire. In a fifth example, the hook end comprises a plurality of hook ends from by two or more of the plurality of horizontal wires of the body, the plurality of hook ends extending beyond the first or second vertical wire. In a sixth example, the clip comprises a plurality of clips rotatably coupled about the first vertical wire and the second vertical wire. In another example, the clip comprises a plurality of clips rotatably coupled about only the first vertical wire or the second vertical wire.

In a further embodiment of the present disclosure, a method of assembling a divider panel to an animal enclosure includes providing the animal enclosure with at least a first member and a second and the divider panel with a top horizontal wire, a bottom horizontal wire, a first vertical wire, a second vertical wire, and a plurality of hook ends; positioning the divider panel within an interior of the animal enclosure; connecting the plurality of hook ends of the divider panel to one of a plurality of wires of the first member; coupling a clip to the first vertical wire of the divider panel after the positioning step, the clip being rotatable about the first vertical wire; rotating the clip about the first vertical wire until it contacts a vertical wire of the second member of the animal enclosure; coupling the clip to the vertical wire of the second member; and dividing the interior of the animal enclosure into a first portion and a second portion once the divider panel is coupled to the at least first and second members.

In an example of this embodiment, the method includes providing the animal enclosure with a third member coupled to at least one of the first member or the second member; coupling a second clip to the second vertical wire of the divider panel after the positioning step; rotating the clip about the second vertical wire until it contacts a vertical wire of the third member of the animal enclosure; and coupling the second clip to the vertical wire of the third member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described herein are not intended to be exhaustive or to limit the disclosure to the precise forms disclosed in the following detailed description. Rather, the embodiments are chosen and described so that others skilled in the art appreciate and understand the principles and practices of the present disclosure.

The present disclosure relates to an animal enclosure. The animal enclosure can be used for multiple purposes, such as to contain one or more animals or objects. The enclosure can be made of any size for accommodating an animal or object of any size. In addition, the enclosure can be made of different materials including aluminum, plastic, and steel. The enclosure can be designed as an animal cage to define an interior that is surrounded at all sides, or it can be designed as an exercise pen in which at least one side is not present, for instance a top side.

Figure 1:
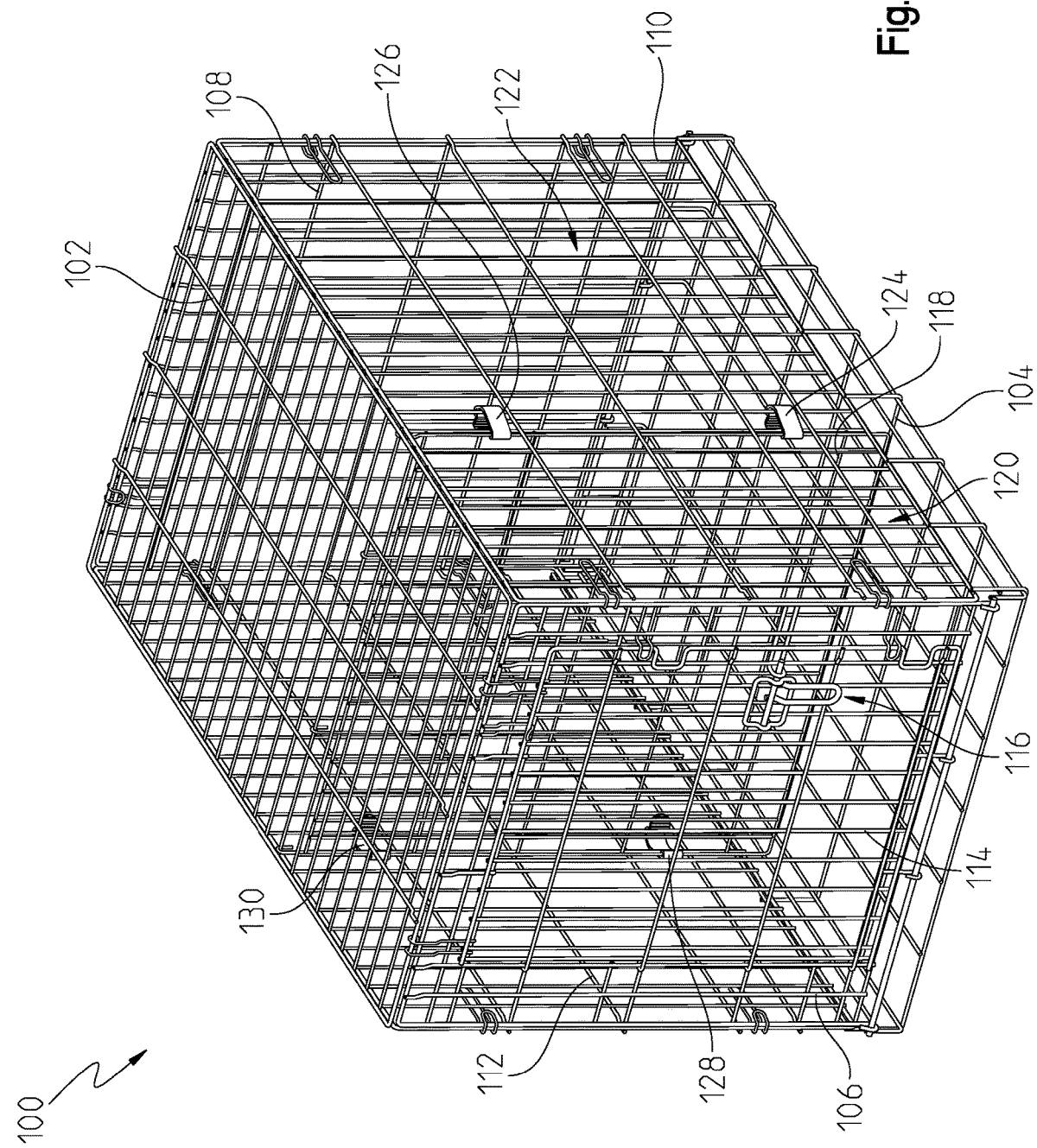
FIG. 1 is a perspective view of an animal enclosure with a first embodiment of a divider panel assembly.

Referring to FIG. 1, one embodiment of an animal enclosure 100 is shown. The enclosure 100 is in the form of an animal crate or cage, but this is only intended to be exemplary. The enclosure 100 may be an exercise pen or any other type of partial or complete enclosure. Moreover, the enclosure 100 can be formed of substantially horizontal and vertical wires that overlap one another to define an interior portion. One or more of the horizontal wires can be coupled to one or more of the vertical wires, and vice versa, to add structural integrity to the enclosure 100. In other embodiments, wires may be oriented in directions other than horizontal and vertical. The wires may be welded, adhered, fastened, or coupled to one another through a variety of means. The enclosure 100 can include a plurality of sides or members that form the enclosure 100.

In FIG. 1, for example, the enclosure 100 includes a top member 102, a bottom member 104, a front member 106, a rear member 108, a first side member 110 and a second side member 112. For sake of clarity, the top member 102 is positioned opposite the bottom member 104, the front member 106 is positioned opposite the rear member 108, and the first side member 110 is positioned opposite the second side member 112, as shown in FIG. 1. The front member 106 may include a door assembly 114 which opens and closes to provide access to the interior of the enclosure 100. A latch assembly 116 is operatively connected to the door assembly 114 and is configured to maintain the door assembly 114 in the closed position when latched. Each individual member, in different embodiments, is coupled to an adjacent member via one or more of a fastener, clip, latch, or other means. For instance, in FIG. 1, each member is coupled to an adjacent member by use of one or more clips. Vertical or horizontal wires of the respective member can be rotatably disposed within the clip to allow the enclosure, of any number of sides, to be configured in a desired manner. While the illustrated embodiment depicts six sides, other embodiments may include any number of sides.

With respect to the enclosure 100, the front member 106 is shown having the door 114. The door 114 is coupled to a frame defined by the front member 106, such that the door 114 can be configured to move between the open position and the closed position. For instance, the door assembly 110 can be pivotally coupled to the frame such that the door 114 can pivot from one position to the other position and in between. Moreover, other members can include a door. Although only one door 114 is shown in FIG. 1, in other embodiments two or more door assemblies for accessing the interior of the enclosure 100 are included.

The latch assembly 116 may comprise a slide bolt latch whereby a slide bolt releasably engages a catch or other structure formed on the frame of the front member 106. In FIG. 1, the door 114 is shown including one or more access portions defined by a vertical wire along its periphery opposite its pivot location. The door 114 may be lifted at least partially vertically to align the access portions with tabs on the frame to allow the door 114 to pivot from its closed position to its open position.

The enclosure 100 of FIG. 1 is also shown to include a divider panel assembly 118. The divider panel assembly 118 may be formed by a plurality of horizontal and vertical wires. Further, the divider panel assembly 118 may be removably coupled to the enclosure, as will be described below. When coupled to the enclosure as in FIG. 1, the divider panel assembly 118 may effectively divide the interior of the enclosure 100 into a first interior portion 120 and a second interior portion 122. In this case, a smaller animal may be better contained within the first interior portion 120, and as it grows the divider panel assembly 118 may be coupled to the enclosure 100 in such a manner that the first interior portion 120 is made larger.

In the embodiment of FIG. 1, the divider panel assembly 118 may be coupled to the enclosure via one or more clips. For instance, a first clip 124 and a second clip 126 may couple the divider panel assembly 118 to the first side member 110, whereas a third clip 128 and a fourth clip 130 may couple the divider panel assembly 118 to the second side member 112. At least in this embodiment, there is at least one clip that couples each side of the divider panel assembly 118 to either the first or second side member. This is further shown in FIG. 2.

Figure 2:
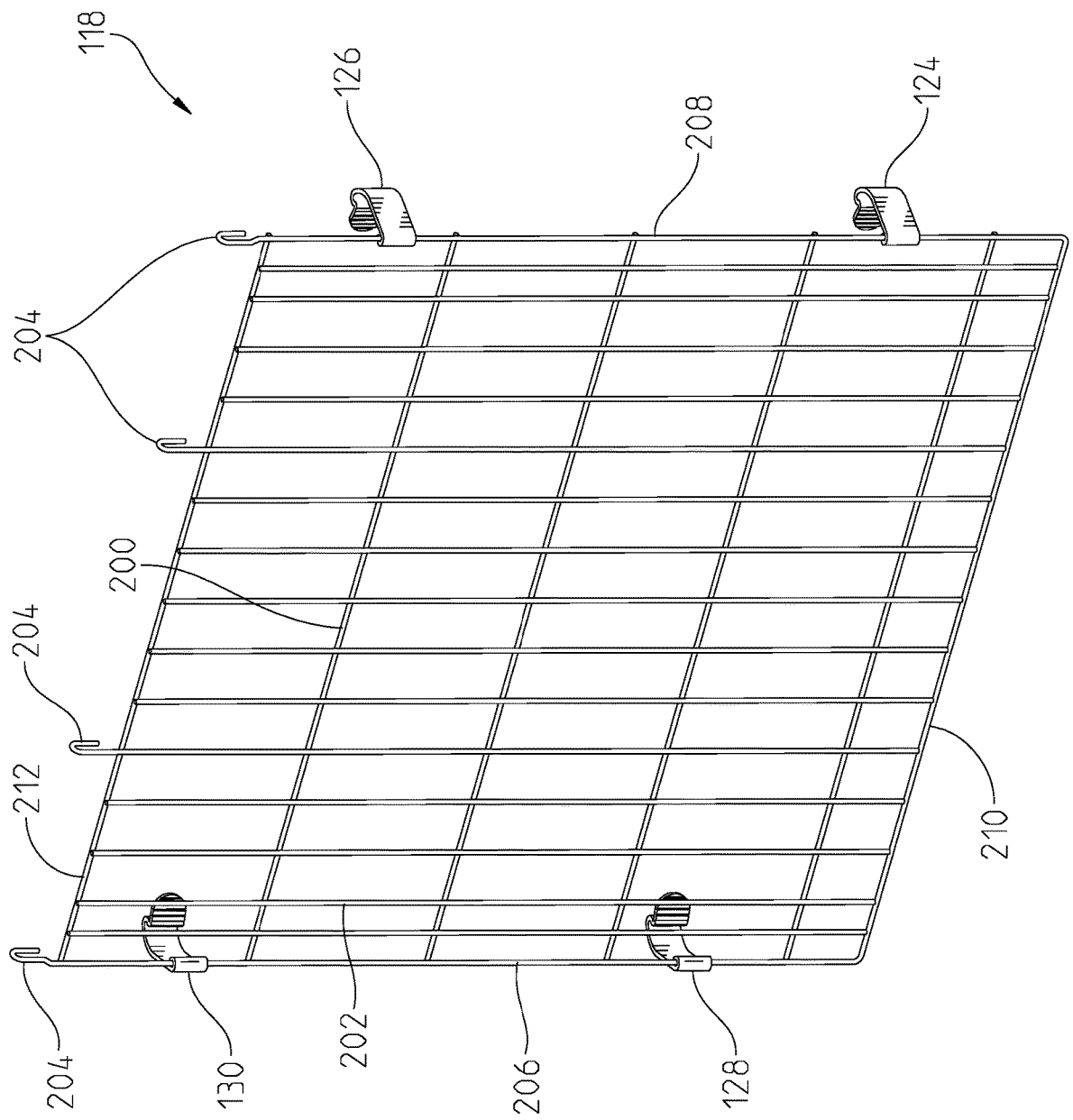
FIG. 2 is a perspective view of the divider panel assembly of FIG. 1.

Referring to FIG. 2, the overall design of the divider panel assembly 118 is better illustrated. As shown, the divider panel assembly 118 may be formed by a plurality of horizontal wires 200 and a plurality of vertical wires 202 that interconnect with one another. Moreover, a plurality of the vertical wires 202 extend above a top horizontal wire 212 and form hook ends 204. The hook ends 204 allow the divider panel assembly 118 to couple to the top member 102 when coupled to the enclosure 100.

The divider panel assembly 118 may have a height and width defined by the top horizontal wire, a bottom horizontal wire 210, a first vertical wire 206, and a second vertical wire 208. In the embodiment shown in FIG. 2, at least two of the hook ends 204 are formed by the first vertical wire 206 and the second vertical wire 208. In other embodiments, only one of or neither the first and second vertical wire may terminate in a hook end.

As described above, the divider panel assembly 118 may include a plurality of clips for coupling to the first and second side members. As shown best in FIG. 2, the plurality of clips may include a first clip 124 and a second clip 126. The first and second clip may releasably couple to the first side member 110. Moreover, the plurality of clips may include a third clip 128 and a fourth clip 130. Here, the third clip 128 and fourth clip 130 may releasably couple to the second side member 112. While two clips are shown on each side of the divider panel assembly 118, it is contemplated that any number of clips may be located on each or both sides.

Further, each of the plurality of clips may be releasably coupled to the divider panel assembly 118. For example, each clip may be snapped into engagement with the divider panel assembly 118. In FIG. 2, for instance, the first clip 124 and the second clip 126 may be snapped on the second vertical wire 208, whereas the third clip 128 and fourth clip 130 may be snapped onto the first vertical wire 206. Since the clips may be releasably coupled to the divider panel assembly 118, each clip may be selectively coupled at any location along the length of the respective vertical wire. In FIG. 2, for example, the space between the first clip 124 and the second clip 126 may be approximately the same as the space between the third clip 128 and the fourth clip 130. A user of the enclosure may selectively adjust the spacing as desired.

When installing the divider panel assembly 118 to the enclosure 100 of FIG. 1, a user may follow a plurality of blocks or steps of assembly. In a first block or step, the hook ends 204 of the divider panel assembly 118 may be coupled to a wire that forms part of the top member 102. With the divider panel assembly 118 essentially hanging from the top member 102, the divider panel assembly 118 may be kept a desired height so there is no interference with a pan (not shown) when the pan is removed from the crate 100 for cleaning. Once the hook ends 204 of the divider panel assembly 118 are coupled to the top member 102, a clip may be coupled to the first vertical wire 206 and the second vertical wire 208 of the divider panel assembly 118 at a desired location. The clip may be snapped on, for example, or it may be coupled in another manner. Once the clip is snapped or coupled to the vertical wire of the divider panel assembly, the clip may freely pivot or rotate thereabout. While step one and two are interchangeable, one may find it easier to execute step one before step two as it may be easier to insert the divider panel assembly 118 into the interior of the enclosure 100 without the clips coupled thereto.

Figure 3:
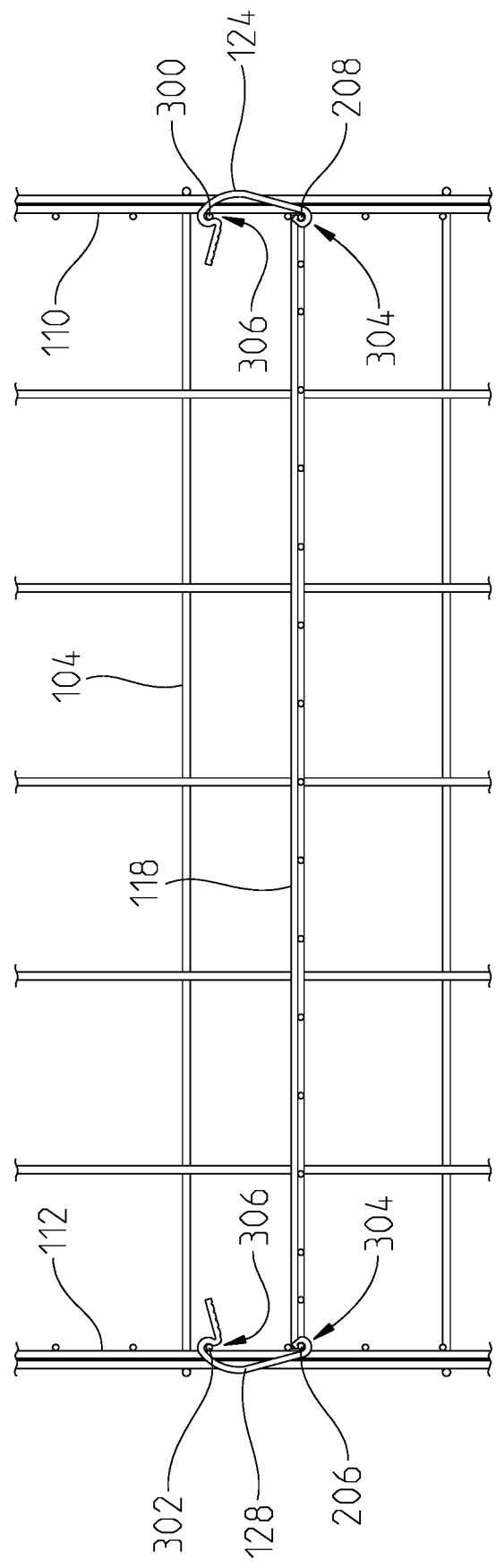
FIG. 3 is a partial top view of the divider panel assembly and a bottom side of the animal enclosure of FIG. 1.

Once the clips are coupled to the divider panel assembly 118, each clip may be rotated into a position for coupling to the respective side member of the enclosure 100. In FIG. 3, for example, the first clip 124 may be rotated into position and coupled to a first side vertical wire 300 of the first side member 110. Likewise, the third clip 128 may be rotated into position and coupled to a second side vertical wire 302 of the second side member 112.

As shown in FIG. 3, each clip may be designed to include a first curled end 304 and a second curled end 306. The first curled end 304 of each clip may be removably coupled to the respective outermost vertical wire of the divider panel assembly 118, whereas the second curled end 306 of each clip may be removably coupled to the respective vertical wire of the first or second side member. In FIG. 3, the outermost vertical wire of the divider panel assembly 118 (e.g., the first vertical wire 206 and second vertical wire 208) may serve as the pivot for each clip. In other words, the vertical wires 206, 208 define pivot axes about which the clips may rotate.

The clips may be formed of any material. In one example, the clips may be formed of a plastic material. In another example, the clips may be formed of an elastic material. In yet another example, the clips may be formed of a metal such as aluminum or steel.

Figure 4:
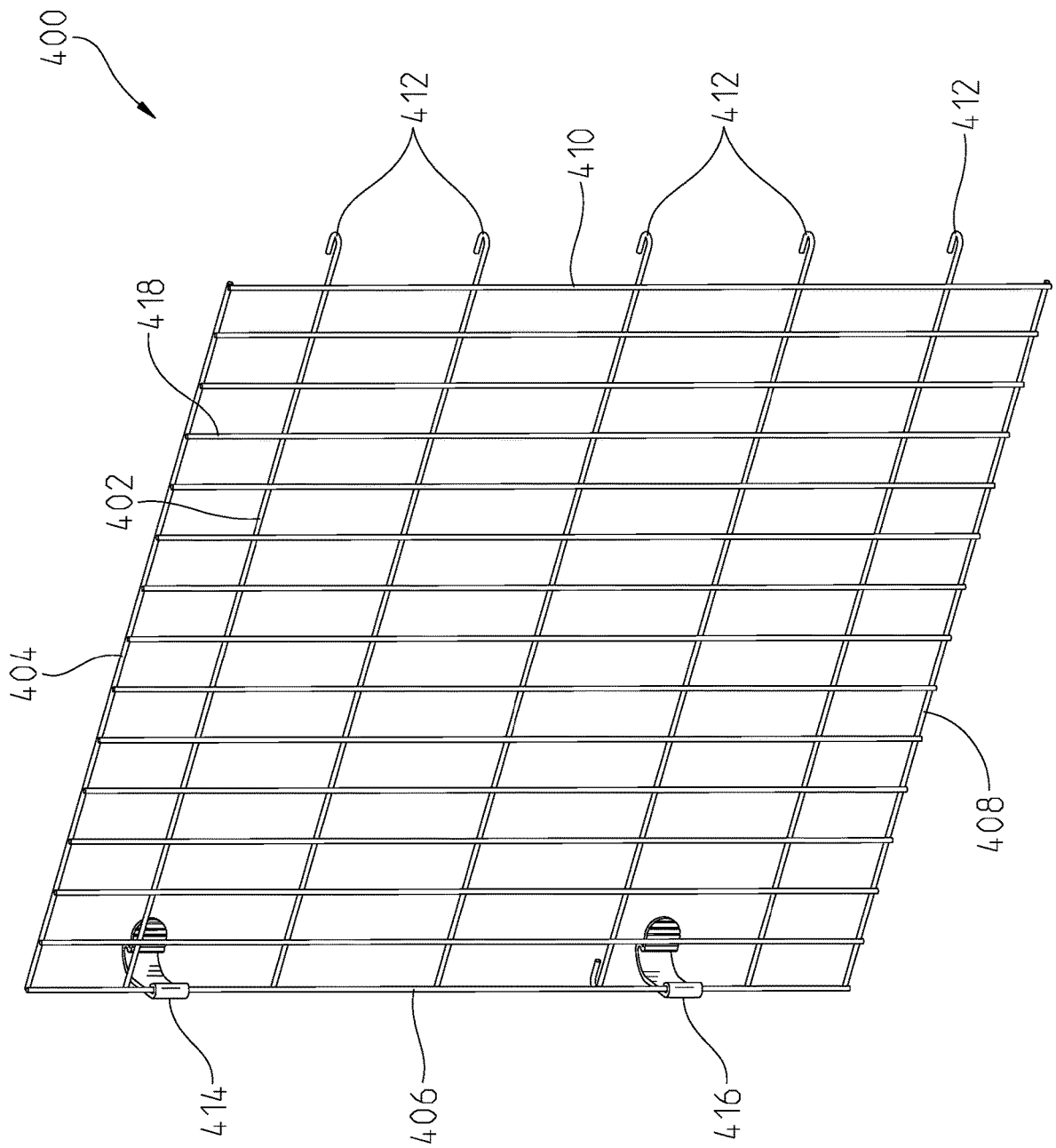
FIG. 4 is a perspective view of a second embodiment of a divider panel assembly.

Referring to FIG. 4, a second embodiment of a divider panel assembly 400 is shown. The divider panel assembly 400 may be formed by a plurality of interconnecting horizontal and vertical wires. For example, the divider panel assembly 400 may include a plurality of horizontal wires 402 and a plurality of vertical wires 418. The height and width of the divider panel assembly 400 may be defined by a top horizontal wire 404, a first vertical wire 406, a bottom horizontal wire 408, and a second vertical wire 410. Each of these wires form an outer periphery of the divider panel assembly 400, and thus are disposed within the interior of the enclosure 100.

Unlike the divider panel assembly 118 of FIGS. 1-3, the divider panel assembly 400 of FIG. 4 may include clips on only one side thereof. As shown, a first clip 414 and a second clip 416 may be removably coupled to the first vertical wire 406 of the assembly 400. Each clip is rotatably coupled to the first vertical wire 406 to allow the respective clip to rotate into a position where it may be coupled to one of the side members of the enclosure.

On the opposite side, a plurality of the horizontal wires 402 extend outward beyond the second vertical wire 410 and form hooked ends 412. As is shown, the hooked ends 412 are formed on the side of the divider panel assembly 400 rather than on the top as in FIG. 2.

For purposes of assembly, the divider panel assembly 400 may be inserted into the interior of the animal enclosure 100 such that the hooked ends 412 may engage the first side member 110 or second side member 112. Once the hooked ends 412 are coupled to the enclosure 100, the one or more clips may be coupled to the first vertical wire 406 of the divider panel assembly 400. In one example, the clips may be snapped onto the vertical wire. In another example, the clips may be fastened to the vertical wire via a fastener or other means. In either case, the clips may be rotatably coupled to the vertical wire such that the vertical wire defines the rotation or pivot axis of the clip. In FIG. 4, there are two clips removably coupled to the first vertical wire 406. In other embodiments, there may be any number of clips removably coupled thereto.

Figure 5:
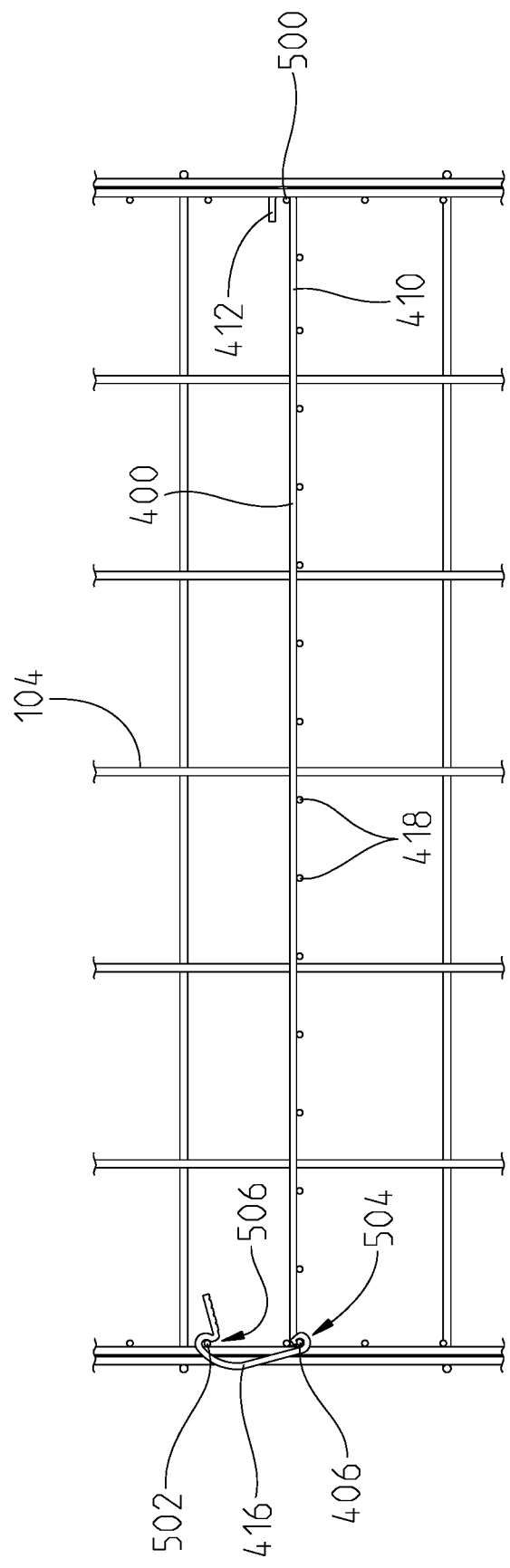
FIG. 5 is a partial top view of the divider panel assembly of FIG. 4.

Once the clips are coupled to the divider panel assembly 400, the clips may be rotated into position to couple to a vertical wire of the first or second side member. In FIG. 5, for example, the hooked end 412 may be coupled to a first side vertical wire 500 of the first or second side member, and the second clip 416 may be removably coupled to a second side vertical wire 502 of the other side member. In one instance, the clip may be snapped into engagement with the second side vertical wire 502.

As shown in FIG. 5, each clip may be designed to include a first curled end 504 and a second curled end 506. The first curled end 504 of each clip may be removably coupled to the respective outermost vertical wire of the divider panel assembly 400, whereas the second curled end 506 of each clip may be removably coupled to the respective vertical wire of the first or second side member. In FIG. 5, the outermost vertical wire of the divider panel assembly 400 (e.g., the first vertical wire 406 and second vertical wire 410) may serve as the pivot for each clip. In other words, the vertical wires 406, 408 define pivot axes about which the clips may rotate.

Figure 6:
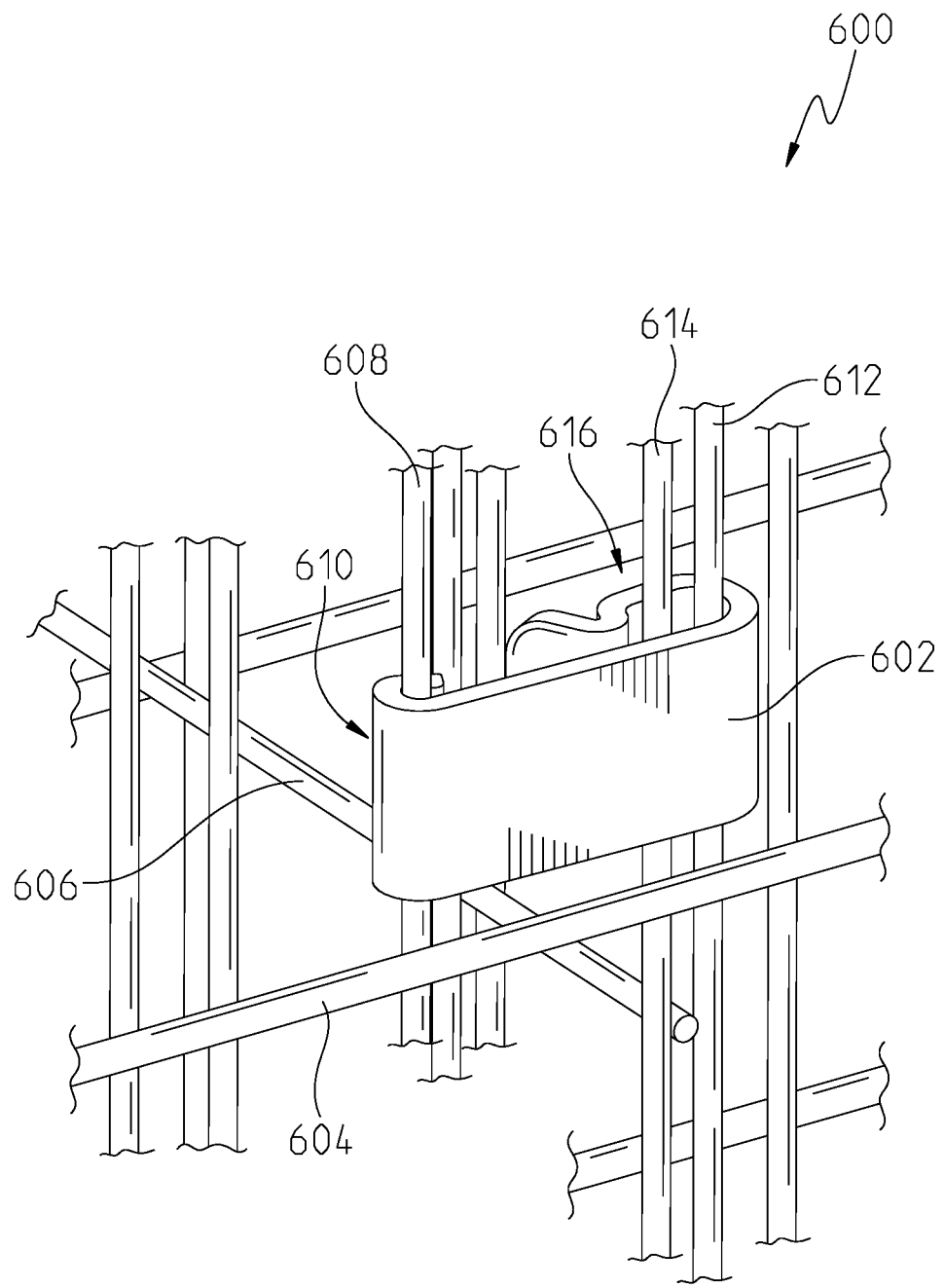
FIG. 6 is a partial perspective view of one embodiment of a clip, divider panel assembly and a side of an animal enclosure.

In the embodiments of FIGS. 1-5, the clips are removably coupled to the divider panel and then the enclosure. FIGS. 6-9 represent alternative embodiments where the clips may be coupled to the enclosure and then coupled to the divider panel assembly. In FIG. 6, for example, a first alternative embodiment of an animal enclosure 600 is shown in which a clip 602 may be fastened or otherwise coupled to the enclosure. In one example, the clip 602 may be mounted in a permanent or semi-permanent manner to the enclosure. Alternatively, the clip 602 may be removably coupled to the enclosure.

In FIG. 6, the clip 602 is shown coupled to a first side member 604 of the enclosure 600 and a divider panel 606. The side member 604 and divider panel 606 may be formed by a plurality of interconnecting horizontal and vertical wires. For instance, the clip 602 may be rotatably coupled at one end 610 about a first vertical wire 608 of the side member 604. When the divider panel 606 is coupled to the enclosure 600, an opposite end 616 of the clip 602 may be removably coupled to a second vertical wire 612 of the side member 604 and a divider panel wire 614, as shown. In this embodiment, the clip 602 may snap into engagement with the second vertical wire 612 and divider panel wire 614. In another embodiment, the clip 602 may couple to the second vertical wire 612 and divider panel wire 614 in another conventional manner other than snapping.

Figure 7:
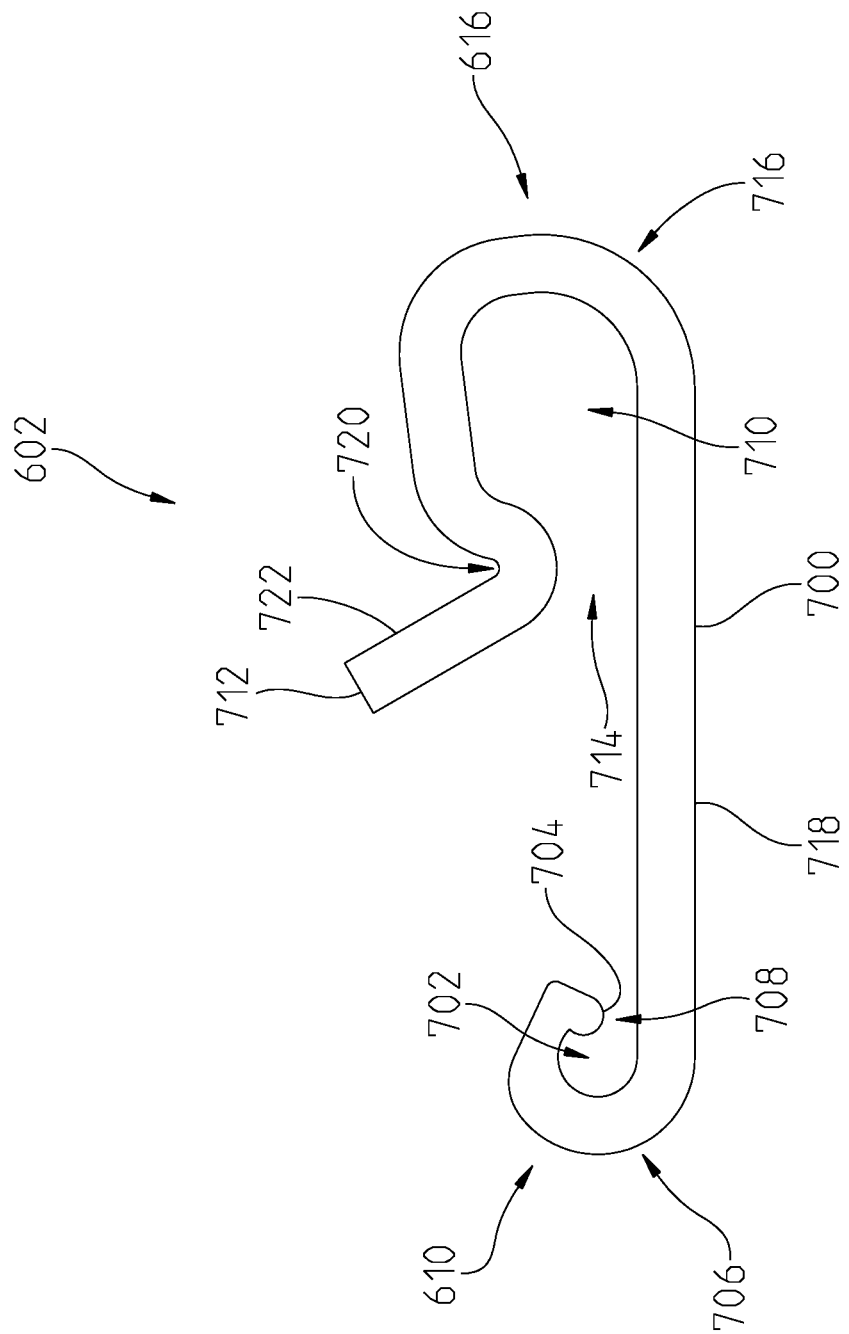
FIG. 7 is a top view of the clip of FIG. 6.

Turning now to FIG. 7, a layout of the clip 602 is shown. The clip 602 may comprise a body 700 which defines a first opening 702 and a second opening 710. The body 700 may include a first end 704 which partially defines the first opening 702 and a second end 712 may partially defines the second opening 710. The body 700 includes a substantially straight portion 718 located between a first curled portion 706 and a second curled portion 716. The first end 704 may be spaced from the substantially straight portion 718 to define a first gap 708, and the second end 712 may be spaced from the substantially straight portion 718 to define a second gap 714. The body 700 may also include a third curled portion 720 which is offset from the second curled portion 716, and a tab portion 722 extends from the third curled portion 720 to the second end 712.

During assembly, the tab portion 722 may be used to assist with coupling the clip 602 to the side member and divider panel. As shown best in FIG. 6, the clip 602 may be rotatably coupled to the side member 604 at a location in front of the divider panel 606. In other words, the divider panel 606 is located rearward of the first vertical wire 608 about which the clip 602 rotates.

The first opening 702 may be smaller than the second opening 710. The first opening 702 may be sized for receiving only a single vertical wire of the side member 604, whereas the second opening 710 is sized to receive a vertical wire of the side member 604 and a vertical wire of the divider panel 606. Moreover, the first gap 708 may be smaller than the second gap 714. The second gap 714 is spaced to allow the clip 602 to be easily removably coupled to the second vertical wire 612 and divider panel wire 614.

The tab portion 722 may be disposed at an angle less than 90° relative to the substantially straight portion 718. Further, the tab portion 722 may not extend too far into the interior of the crate so as to accidentally catch on a collar of an animal disposed within the enclosure 600.

Figure 8:
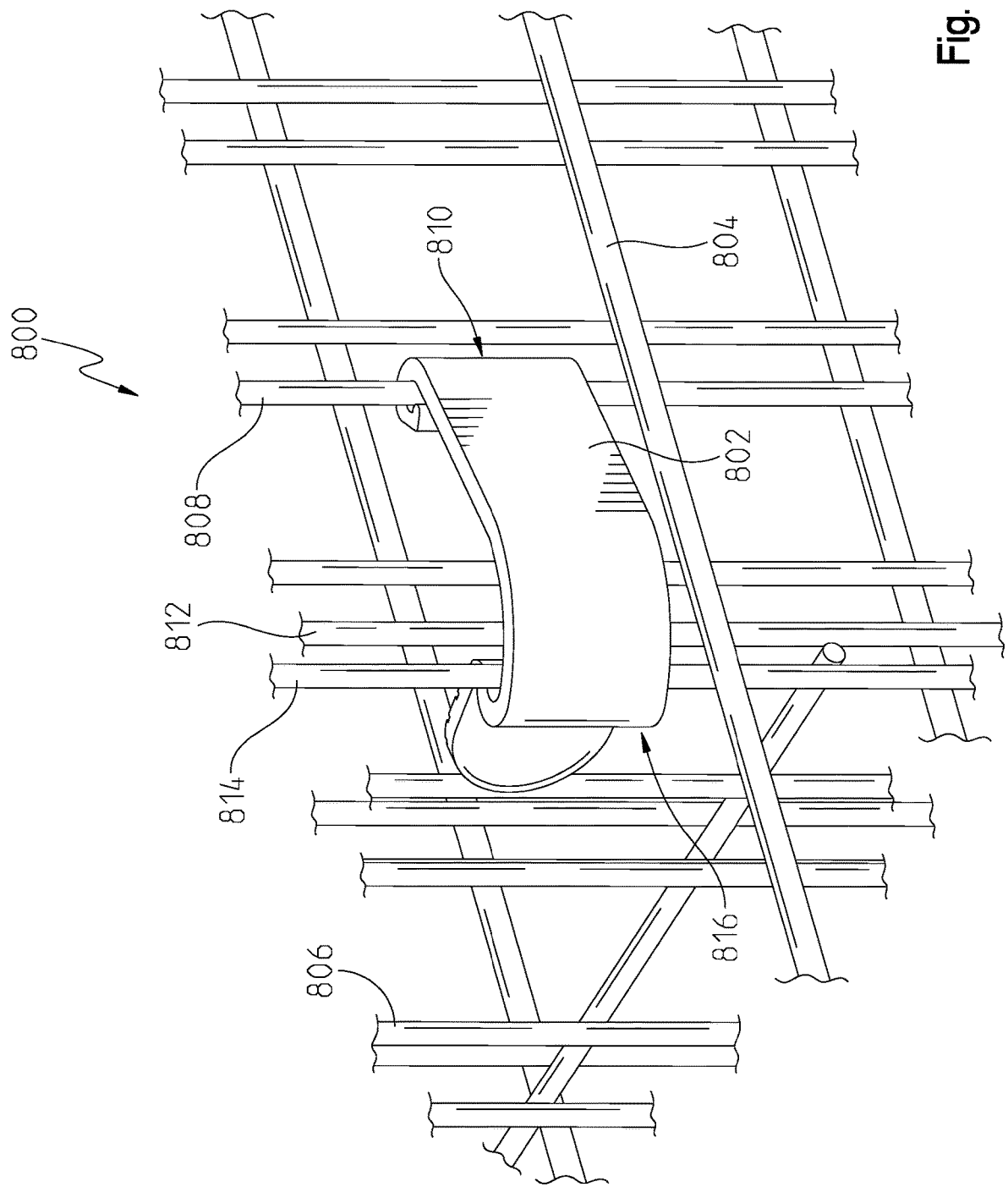
FIG. 8 is a partial perspective view of another embodiment of a clip, divider panel assembly and a side of an animal enclosure.
Figure 9:
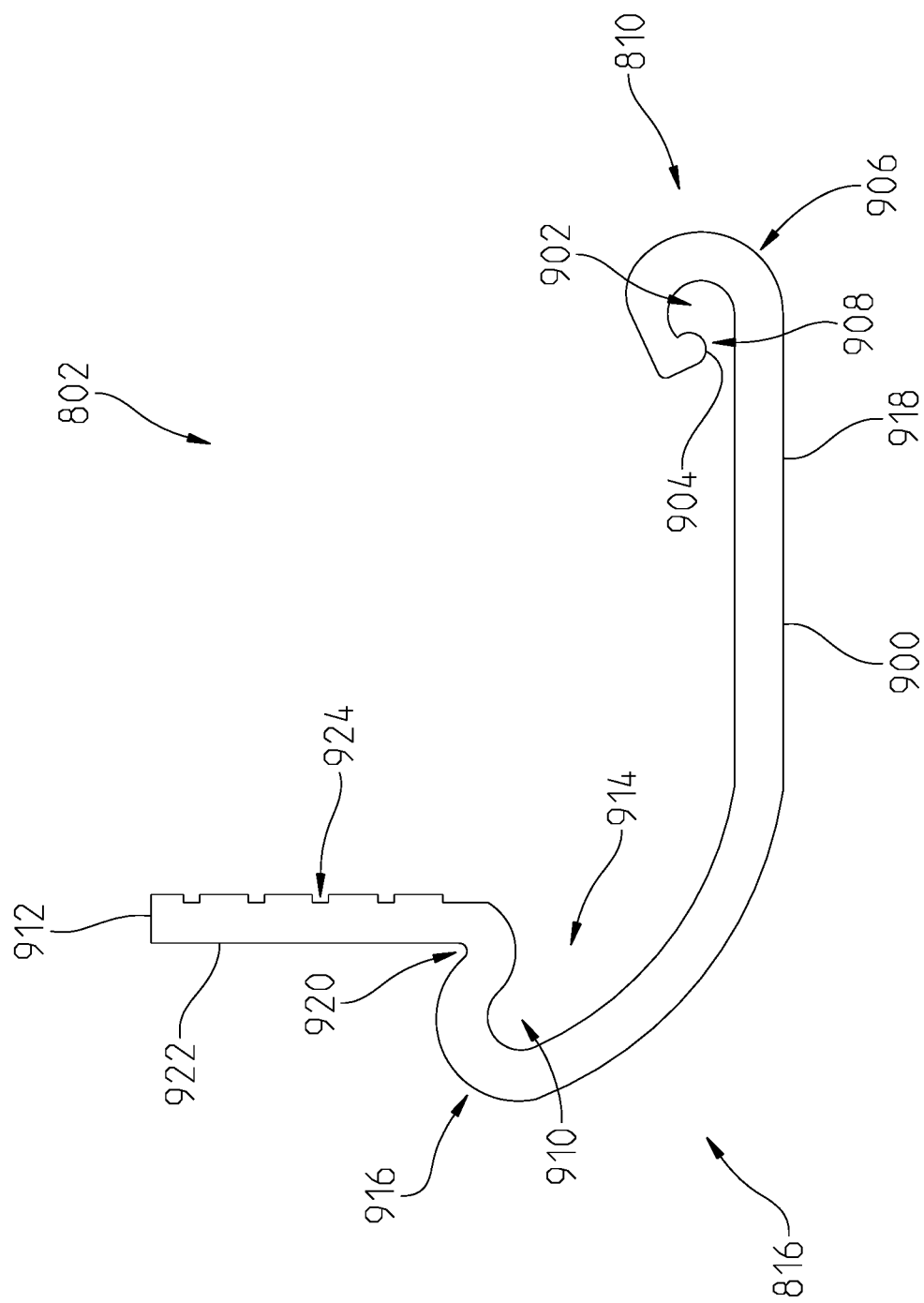
FIG. 9 is a top view of the clip of FIG. 8.

Another alternative embodiment is illustrated in FIGS. 8 and 9. In FIG. 9, a second alternative embodiment of an animal enclosure 800 is shown in which a clip 802 may be fastened or otherwise coupled to the enclosure 800. In one example, the clip 802 may be mounted in a permanent or semi-permanent manner to the enclosure. Alternatively, the clip 802 may be removably coupled to the enclosure 800.

In FIG. 8, the clip 802 is shown coupled to a side member 804 of the enclosure 800 and a divider panel 806. The side member 804 and divider panel 806 may be formed by a plurality of interconnecting horizontal and vertical wires. For instance, the clip 802 may be rotatably coupled at one end 810 about a first vertical wire 808 of the side member 804. When the divider panel 806 is coupled to the enclosure 800, an opposite end 816 of the clip 802 may be removably coupled to a second vertical wire 812 of the side member 804 and a divider panel wire 814, as shown. In this embodiment, the clip 802 may snap into engagement with the second vertical wire 812 and divider panel wire 814. In another embodiment, the clip 802 may couple to the second vertical wire 812 and divider panel wire 814 in another conventional manner other than snapping.

In FIG. 9, a layout of the clip 802 is shown. The clip 802 may comprise a body 900 which defines a first opening 902 and a second opening 910. The body 900 may include a first end 904 which partially defines the first opening 902 and a second end 912 may partially defines the second opening 910. The body 900 includes a substantially straight portion 918 located between a first curled portion 906 and a second curled portion 916. The first end 904 may be spaced from the substantially straight portion 918 to define a first gap 908, and the second end 912 may be spaced from the substantially straight portion 918 to at least partially define a second gap 914. The body 900 may also include a third curled portion 920 which is offset from the second curled portion 916, and a tab portion 922 extends from the third curled portion 920 to the second end 912. The tab portion 922 may include a gripping surface 924 of ridges to assist with the assembly of the divider panel and enclosure.

During assembly, the tab portion 922 may be used to assist with coupling the clip 802 to the side member 804 and divider panel 806. As shown best in FIG. 8, the clip 802 may be rotatably coupled to the side member 804 at a location rearward of the divider panel 806. In other words, the divider panel 806 is located forward of the first vertical wire 808 about which the clip 802 rotates.

The first opening 902 may be smaller than the second opening 910. The first opening 902 may be sized for receiving only a single vertical wire of the side member 804, whereas the second opening 910 is sized to receive a vertical wire of the side member 804 and a vertical wire of the divider panel 806. Moreover, the first gap 908 may be smaller than the second gap 914. The second gap 914 is spaced to allow the clip 802 to be easily removably coupled to the second vertical wire 812 and divider panel wire 814.

The tab portion 922 may be disposed at an angle approximately 90° relative to the substantially straight portion 918. Further, the tab portion 922 may not extend too far into the interior of the crate so as to accidentally catch on a collar of an animal disposed within the enclosure 900.

While exemplary embodiments incorporating the principles of the present disclosure have been disclosed herein, the present disclosure is not limited to the disclosed embodiments. Instead, this disclosure is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A divider panel assembly for being assembled within an interior of an animal enclosure, comprising:
a body defined by a plurality of interconnecting horizontal and vertical wires, the body including a height and width defined by a top horizontal wire, a bottom horizontal wire, a first vertical wire and a second vertical wire;
a hook end formed by at least one of the plurality of horizontal or vertical wires of the body, the hook end configured to engage with the animal enclosure; and
a clip rotatably coupled to the first vertical wire or the second vertical wire, the clip including a first defined opening defining a first gap at a first curled portion, at a first end of the clip, for receiving the first or second vertical wire, a second defined opening defining a second gap at a second curled portion, a third curled portion located adjacent to the second curled portion, a substantially straight portion located between the first opening and the second opening, the second opening configured for receiving a wire of the animal enclosure, and a tab portion extending from the third curled portion to a second end of the clip, wherein the tab portion extends substantially perpendicular to the substantially straight portion and includes a gripping surface to assist with assembly of the divider panel and the animal enclosure, wherein the gripping surface includes ridges.

2. The divider panel assembly of claim 1, wherein the hook end comprises a plurality of hook ends formed by two or more of the plurality of vertical wires of the body.

3. The divider panel assembly of claim 2, wherein the plurality of hook ends extend beyond the top horizontal wire.

4. The divider panel assembly of claim 1, wherein the hook end comprises a plurality of hook ends formed by two or more of the plurality of horizontal wires of the body.

5. The divider panel assembly of claim 4, wherein the plurality of hook ends extend beyond the first or second vertical wire.

6. The divider panel assembly of claim 1, wherein the clip comprises a plurality of clips rotatably coupled about the first vertical wire and the second vertical wire and the griping surface of each of the plurality of clips includes ridges.

7. The divider panel assembly of claim 1, wherein the clip comprises a plurality of clips rotatably coupled about only the first vertical wire or the second vertical wire and the gripping surface of each of the plurality of clips includes ridges.

8. The divider panel assembly of claim 1, wherein:
the hook end comprises a plurality of hook ends formed by two or more of the plurality of vertical wires of the body, the plurality of hook ends extending beyond the top horizontal wire; and
the clip comprises a plurality of clips rotatably coupled about the first and second vertical wire and the gripping surface of each of the plurality of clips includes ridges.

9. The divider panel of claim 1, wherein:
the hook end comprises a plurality of hook ends formed by two or more of the plurality of horizontal wires of the body, the plurality of hook ends extending beyond the first vertical wire; and
the clip comprises a plurality of clips rotatably coupled about the second vertical wire, and each of the gripping surface of each of the plurality of clips includes ridges.

10. The divider panel of claim 1, wherein the clip is removably coupled to the first vertical wire or the second vertical wire in a snap-fit connection.

11. An animal enclosure, comprising:
a plurality of enclosure members each formed by a plurality of enclosure interconnecting horizontal and vertical wires, the plurality of enclosure members defining an interior of the animal enclosure and including at least a first side member and a second side member;
a divider panel assembly comprising a divider body defined by a plurality of divider interconnecting horizontal and vertical wires, the divider body including a height and width defined by a top horizontal divider wire, a bottom horizontal divider wire, a first vertical divider wire and a second vertical divider wire;
a hook end formed by at least one of the plurality of divider horizontal or vertical wires of the divider body, the hook end configured to engage with one of the plurality of enclosure members of the animal enclosure when the divider panel assembly is positioned within the interior; and
a clip coupled to the first vertical divider wire or the second vertical divider wire, the clip including a first defined opening defining a first gap at a first curled portion at a first end of the clip for receiving the first or second vertical divider wire of the divider panel assembly, a second defined opening defining a second gap at a second curled portion, a third curled portion located adjacent to the second curled portion, the second gap for receiving one of the plurality of vertical wires of the first side member or second side member, a tab portion extending from the third curled portion to a second end of the clip and extending substantially perpendicular to a substantially straight portion located between the first opening and the second opening of the clip, wherein the tab portion extends substantially perpendicular to the substantially straight portion and includes a gripping surface to assist with assembly of the divider panel and the animal enclosure, wherein the gripping surface includes ridges;
wherein, when the divider panel assembly is positioned within the interior of the animal enclosure, the hook end is coupled to one of the plurality of horizontal or vertical wires of one of the plurality of members, and the clip is coupled to one of the plurality of vertical wires of the first side member or second side member;
further wherein, when the divider panel assembly is coupled to the animal enclosure within the interior thereof, the divider panel assembly divides the interior into a first portion and a second portion so as to block access between the first and second portions.

12. The animal enclosure of claim 11, wherein the hook end is coupled to a different wire than the clip.

13. The animal enclosure of claim 11, wherein the plurality of enclosure members includes a top member of the animal enclosure, wherein the hook end is coupled to the top member and the clip is coupled to the first vertical divider wire or the second vertical divider wire.

14. The animal enclosure of claim 11, wherein:
the hook end extends laterally beyond the first vertical wire;
wherein the clip is rotatably coupled to the second vertical wire; and
when the divider panel assembly is coupled to the animal enclosure, the hook end is coupled to one of the plurality of vertical wires of the first side member and the clip is coupled to one of the plurality of vertical wires of the second side member.

15. The animal enclosure of claim 11, wherein the hook end comprises a plurality of hook ends formed by two or more of the plurality of vertical wires of the body, the plurality of hook ends extending beyond the top horizontal wire.

16. The animal enclosure of claim 11, wherein the hook end comprises a plurality of hook ends formed by two or more of the plurality of horizontal wires of the body, the plurality of hook ends extending beyond the first or second vertical wire.

17. The animal enclosure of claim 11, wherein the clip comprises a plurality of clips rotatably coupled about the first vertical wire and the second vertical wire and the gripping surface of each of the plurality of clips includes ridges.

18. The animal enclosure of claim 11, wherein the clip comprises a plurality of clips rotatably coupled about only the first vertical wire or the second vertical wire and the gripping surface of each of the plurality of clips includes ridges.

19. A method of assembling a divider panel to an animal enclosure, comprising:
providing the animal enclosure with at least a first member and a second member and the divider panel with a top horizontal divider wire, a bottom horizontal divider wire, a first vertical divider wire, a second vertical divider wire, and a plurality of hook ends;
positioning the divider panel within an interior of the animal enclosure;
connecting the plurality of hook ends of the divider panel to one of a plurality of wires of the first member;
providing a clip including a first defined opening at a first end of the clip, and a second defined opening at a second end of the clip, a tab portion located between the second end of the clip and the second opening of the clip, wherein the tab portion includes a gripping surface to assist with assembly of the divider panel and the animal enclosure;
coupling the first defined opening of the clip, to a first vertical wire of the second member after the positioning step, the clip being rotatable about the first vertical wire of the second member;
rotating the clip about the first vertical divider wire of the second member until the clip contacts the first vertical divider wire of the divider member of the animal enclosure;
coupling the clip to the first vertical divider wire of the divider panel with the second opening of the clip, wherein the tab portion is used to assist with coupling the clip to the first vertical divider wire of the divider wire; and
dividing the interior of the animal enclosure into a first portion and a second portion once the divider panel is coupled to the at least first and second members.

20. The method of claim 19, further comprising:
providing the animal enclosure with a third member coupled to at least one of the first member or the second member, the third member including a third vertical wire;
coupling a second clip having a tab portion to the third vertical wire of the third member;
rotating the second clip about the third vertical wire until the clip contacts the second vertical divider wire of the divider member; and coupling the second clip to the second vertical divider wire of the divider member, wherein the tab portion of the second clip is used to assist with coupling the second clip to the third vertical wire of the third member.

* * * * *